(12) United States Patent
Kim et al.

(10) Patent No.: US 12,218,747 B2
(45) Date of Patent: Feb. 4, 2025

(54) APPARATUS AND METHOD FOR PROVIDING EXPOSURE SERVICE OF USER PLANE FOR TIME SENSITIVE COMMUNICATION IN WIRELESS COMMUNICATION SYSTEM

(71) Applicant: ELECTRONICS AND TELECOMMUNICATIONS RESEARCH INSTITUTE, Daejeon (KR)

(72) Inventors: Changki Kim, Daejeon (KR); Jeoung Lak Ha, Daejeon (KR); Yoo Hwa Kang, Daejeon (KR); Seung Han Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/143,144

(22) Filed: May 4, 2023

(65) Prior Publication Data

US 2023/0361901 A1 Nov. 9, 2023

(30) Foreign Application Priority Data

May 6, 2022 (KR) .................. 10-2022-0055961
Aug. 8, 2022 (KR) .................. 10-2022-0098791
(Continued)

(51) Int. Cl.
*G06F 15/173* (2006.01)
*H04J 3/06* (2006.01)
(Continued)

(52) U.S. Cl.
CPC .......... *H04J 3/0667* (2013.01); *H04L 7/0008* (2013.01); *H04L 41/0894* (2022.05)

(58) Field of Classification Search
CPC ....... H04W 76/10; H04W 8/18; H04J 3/0685; H04J 3/0667; H04L 67/14; H04L 41/0894; H04L 7/0008
See application file for complete search history.

(56) References Cited

U.S. PATENT DOCUMENTS 11,632,472 B2 * 4/2023 Belling ............ H04M 15/8038
455/406
2020/0267088 A1 * 8/2020 Navrátil ................. H04L 43/16
(Continued)

FOREIGN PATENT DOCUMENTS

| EP | 3 897 011 B1 | 8/2022 | |
|---|---|---|---|
| WO | WO-2021094236 A1 * | 5/2021 | ............ H04L 67/14 |
| WO | WO-2023213796 A1 * | 11/2023 | ........... H04L 43/062 |

OTHER PUBLICATIONS

3GPP, "3rd Generation Partnership Project; Technical Specification Group Services and System Aspects; Procedures for the 5G System (5GS); Stage 2 (Release 17)", 3GPP TS 23.502 V17.4.0 (Mar. 2022).

(Continued)

*Primary Examiner* — Dustin Nguyen
*Assistant Examiner* — Hao H Nguyen
(74) *Attorney, Agent, or Firm* — LRK PATENT LAW FIRM

(57) ABSTRACT

An apparatus and method for directly exposing, by user plane function/network side-time sensitive networking translator (UPF/NW-TT), event result information to time sensitive networking (TSN) or time sensitive communication time synchronization function (TSCTSF) through service interface (Nupf) in wireless communication system. A method of operating event processing for TSN or TSC includes: when policy control function (PCF) performs TSC event subscription, receiving TSC management and control information for direct reporting notification of event result (Continued)

from TSN-application function or TSCTSF and transmitting the TSC management and control information to session management function (SMF); regenerating the TSC management and control information and transmitting the regenerated TSC management and control information to UPF/NW-TT through N4 interface; and receiving the TSC management and control information from SMF, and when a corresponding event occurs, transmitting the TSC management information including the event result to a target in the control information through SBI.

15 Claims, 11 Drawing Sheets

(30) Foreign Application Priority Data

Aug. 8, 2022 (KR) .................. 10-2022-0098852
Sep. 30, 2022 (KR) .................. 10-2022-0125315
Apr. 5, 2023 (KR) .................. 10-2023-0044479

(51) Int. Cl.
  *H04L 7/00* (2006.01)
  *H04L 41/0894* (2022.01)

(56) References Cited

U.S. PATENT DOCUMENTS

| | | | | |
|---|---|---|---|---|
| 2020/0404106 A1* | 12/2020 | Belling | ................ | H04M 15/83 |
| 2021/0226092 A1* | 7/2021 | Choi | ................ | H01L 25/0753 |
| 2021/0274575 A1* | 9/2021 | Talebi Fard | .......... | H04W 76/12 |
| 2021/0281658 A1* | 9/2021 | Kweon | ................ | H04L 67/30 |
| 2021/0321466 A1* | 10/2021 | Colom | ................ | H04W 76/10 |
| 2021/0321487 A1* | 10/2021 | Moon | ................ | H04W 76/11 |
| 2022/0149964 A1* | 5/2022 | Kang | ................ | H04J 3/0685 |
| 2022/0159446 A1* | 5/2022 | Zhou | ................ | H04W 4/50 |
| 2022/0256390 A1* | 8/2022 | Sun | ................ | H04W 36/0044 |
| 2022/0353167 A1* | 11/2022 | Mishra | ................ | H04L 43/0811 |
| 2022/0361120 A1 | 11/2022 | Kim et al. | | |
| 2023/0019215 A1* | 1/2023 | Wang | ................ | H04L 47/24 |
| 2023/0060429 A1* | 3/2023 | Zhou | ................ | H04L 12/189 |
| 2023/0137509 A1* | 5/2023 | Alonso | ................ | H04L 12/1407 |
| | | | | 455/406 |
| 2023/0143200 A1* | 5/2023 | Kweon | ................ | H04L 41/5051 |
| | | | | 709/223 |
| 2023/0188381 A1* | 6/2023 | Luetzenkirchen | .... | H04W 76/11 |
| | | | | 370/328 |
| 2023/0199868 A1* | 6/2023 | Kedalagudde | ........ | H04L 67/141 |
| | | | | 370/328 |
| 2023/0309158 A1* | 9/2023 | Qiao | ................ | H04W 72/1268 |
| 2023/0319646 A1* | 10/2023 | Estevez | ............. | H04W 28/0268 |
| 2023/0328596 A1* | 10/2023 | Qiao | ................ | H04W 36/0011 |
| | | | | 370/330 |

OTHER PUBLICATIONS

3GPP, "3rd Generation Partnership Project; Technical Specification Group Services and System Aspects; Study on UPF enhancement for Exposure and SBA (Release 18)", 3GPP TR 23.700-62 V0.4.0 (Aug. 2022).

* cited by examiner

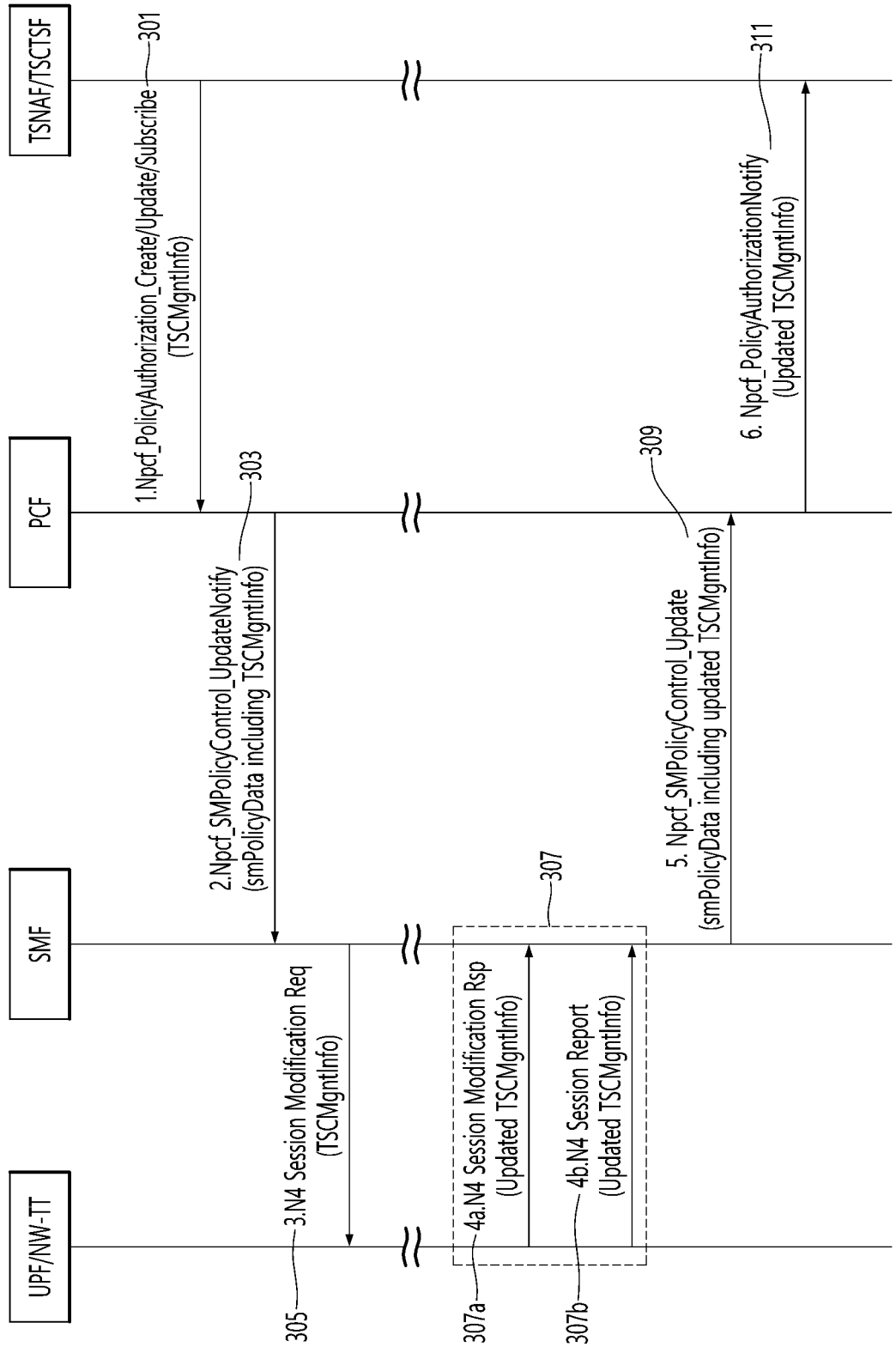

Fig.5b

| Information elements | P | Condition / Comment | IE Type |
|---|---|---|---|
| Node ID | M | This IE shall contain the unique identifier of the sending Node. | Node ID |
| Recovery Time Stamp | M | This IE shall contain the time stamp when the CP or UP function was started, see clause 19A of 3GPP TS 23.007 [24]. (NOTE) | Recovery Time Stamp |
| UP Function Features | C | This IE shall be present if the UP function sends this message and the UP function supports at least one UP feature defined in this IE. When present, this IE shall indicate the features the UP function supports. | UP Function Features |
| CP Function Features | C | This IE shall be present if the CP function sends this message and the CP function supports at least one CP feature defined in this IE. When present, this IE shall indicate the features the CP function supports. | CP Function Features |
| ... | | | |

Fig.6

| Information elements | | | | Condition / Comment |
|---|---|---|---|---|
| Supported Event List | Event ID or Name | Supporting SBI | Directing Reporting function | When this IE present, this IE shall indicate the event list and the additional function for each event the UP function supports. |
| | ... | ... | ... | |
| | Event ID or Name | Supporting SBI | Directing Reporting function | |

APPARATUS AND METHOD FOR PROVIDING EXPOSURE SERVICE OF USER PLANE FOR TIME SENSITIVE COMMUNICATION IN WIRELESS COMMUNICATION SYSTEM

CROSS-REFERENCE TO RELATED APPLICATIONS

This application claims priority to and the benefit of Korean Patent Application No. 10-2022-0055961, filed on May 6, 2022 and Korean Patent Application No. 10-2022-0098791, filed on Aug. 8, 2022 and Korean Patent Application No. 10-2022-0098852, filed on Aug. 8, 2022 and Korean Patent Application No. 10-2022-0125315, filed on Sep. 30, 2022 and Korean Patent Application No. 10-2023-0044479, filed on Apr. 5, 2023, the disclosure of which is incorporated herein by reference in its entirety.

BACKGROUND

1. Field of the Invention

The present disclosure generally relates to a wireless communication system, and more particularly, to an apparatus and method for providing an exposure service of a user plane for time sensitive communication in a wireless communication system.

2. Description of Related Art

A major organization 3GPP SA2 for mobile communication standardization completed stage 2 standardization for Rel-17 in the 5G System (5GS) standardization Phase 2 in December 2021. Thereafter, the study work for standardization of Rel-18 began in January 2022 and is currently in progress with the goal of completing the stage 2 standard specification of Rel-18 by June, 2023.

In the SA2, a control plane of the 5G core network was standardized based on a service-based architecture (SBA)-based principle from Rel-15, but a user plane function (UPF) was not included in the SBA structure due to reasons such as performance issues.

Thereafter, a study item (SI) was created and is currently being worked on to be included in the SBA of the UPF again in the Rel-18. According to a working technical report (TR23.700-62) related to this, in the Rel-18, the UPF is limited to providing an event exposure service only.

Meanwhile, in the SA2, in order to meet the requirements for application of 5G systems to various vertical industries, standardization work to support time sensitive communication (TSC) completed to through the Rel-16 and Rel-17.

SUMMARY OF THE INVENTION

The present disclosure is directed to providing an apparatus and method for providing an exposure service of a user plane for time sensitive communication in a wireless communication system.

In addition, the present disclosure is directed to providing an apparatus and method for directly exposing, by a user plane function (UPF), event result information to a time sensitive networking application function (TSN AF) or a time sensitive communication time synchronization function (TSCTSF) through a service interface (Nupf) in a wireless communication system.

According to an aspect of the present invention, there is provided a method of operating event processing for TSN or time sensitive communication (TSC) in a wireless communication system, including: when a policy control function (PCF) performs a TSC event subscription with a session management function (SMF); receiving TSC management information and control information required for direct reporting notification of an event result from a TSN AF or a TSCTSF and transmitting the received TSC management information and the control information to a session management function (SMF) through a service based interface (SBI); regenerating, by the SMF, the TSC management information and the control information received from the PCF through the SBI and transmitting the regenerated TSC management information and the control information to a UPF/network side-TSN translator (UPF/NW-TT) through an N4 interface; and receiving, by the UPF/NW-TT, the TSC management information and the control information for the direct reporting notification of the event result from the SMF, and when the corresponding event occurs, and directly transmitting the generated TSC management information including the event result through the Nupf SBI to a target included in the received the control information.

According to another aspect of the present invention, there is provided an apparatus for operating event processing for TSN or TSC in a wireless communication system, including: a PCF, an SMF, and a UPF/NW-TT, in which, when the PCF performs a TSC event subscription, the PCF may receive TSC management information and control information required for direct reporting notification of an event result from a TSN or TSCTSF and transmit the received TSC management information and the control information to the SMF through an SBI, the SMF may regenerate the TSC management information and the control information received from the PCF through the SBI and transmit the regenerated TSC management information and the control information to the UPF/NW-TT through an N4 interface, and the UPF/NW-TT may receive the TSC management information and the control information received from the SMF, and when a corresponding event occurs, directly transmit the TSC management information including the event result to a target included in the control information through the SBI.

According to another aspect of the present invention, there is provided a method of operating a TSN or TSCTSF in a wireless communication system, including: transmitting TSC management information and control information to a UPF/NW-TT through an N4 interface via a PCF and an SMF through an SBI; and directly receiving an event result through a target address (TSN AF or TSCTSF) included in the control information through an Nupf SBI from the UPF/NW-TT when a corresponding event occurs.

According to another aspect of the present invention, there is provided a TSN AF or TSCTSF in a wireless communication system, including: a transceiver; and a control unit configured to be operably connected to the transceiver, in which the control unit may transmit TSC management information and control information to a UPF/NW-TT via a PCF and an SMF through an SBI, and directly receive the TSC management information including an event result through the control information through the Nupf SBI from the UPF/NW-TT when a corresponding event occurs.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is a diagram illustrating an example of an event processing procedure related to the TSN and TSC between a time sensitive networking application function (TSN AF) or a time sensitive communication time synchronization function (TSCTSF) and user plane function/network side-TSN translator (UPF/NW-TT) according to various embodiments of the present disclosure;

FIGS. 5A and 5B are diagrams illustrating an example of an initial association setup procedure and an exchanged information element between a conventional session management function (SMF) and UPF according to various embodiments of the present disclosure;

FIG. 6 is a diagram illustrating an example of an event exposure capability information element of the UPF transmitted from the UPF to the SMF through an N4 interface association setup procedure according to an embodiment of the present disclosure;

DETAILED DESCRIPTION OF EXEMPLARY EMBODIMENTS

Figure 1:
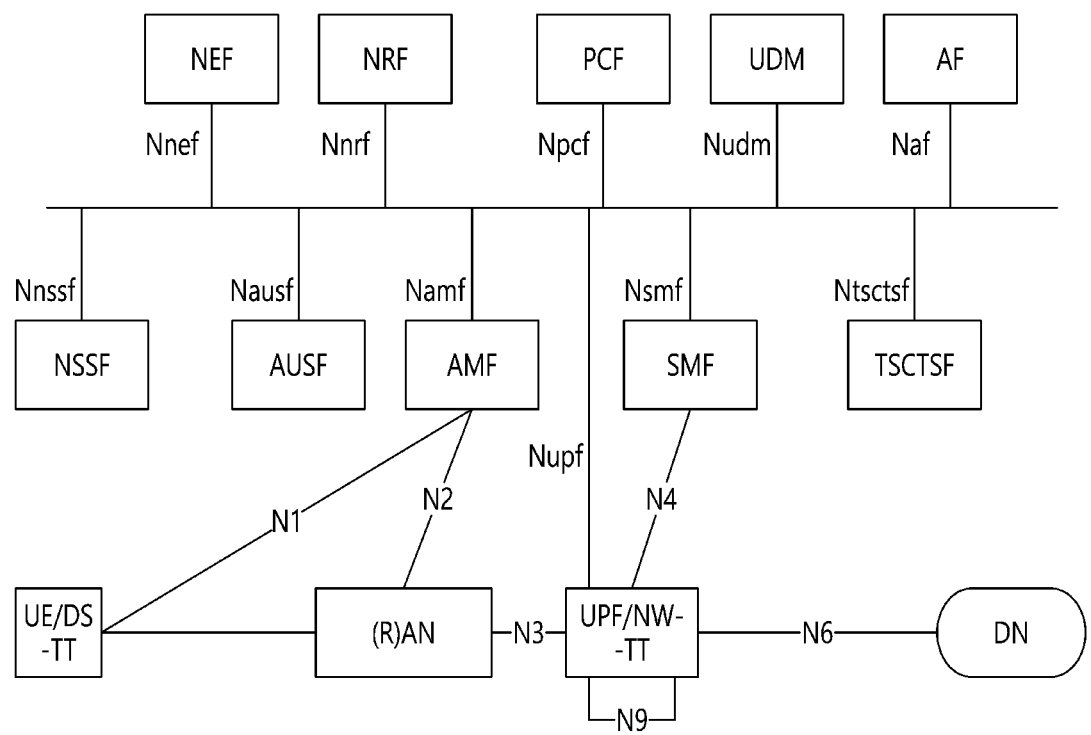
FIG. 1 is a diagram illustrating an example of a 5G system architecture in which a service-based architecture (SBA) is applied to a user plane function (UPF) according to various embodiments of the present disclosure.

Terms used in the present disclosure may be used only in order to describe specific exemplary embodiments rather than restricting the scope of other exemplary embodiments. Singular forms may include plural forms unless the context clearly indicates otherwise. Terms used in the present disclosure including technical and scientific terms have the same meanings as those that are generally understood by those skilled in the art to which the present disclosure pertains. Terms defined in a general dictionary among terms used in the present disclosure may be interpreted with meanings that are the same as or similar to meanings within a context of the related art, and are not interpreted with ideal or excessively formal meanings unless clearly defined in the present disclosure. In some cases, even terms defined in the present disclosure may not be interpreted to exclude exemplary embodiments of the present disclosure.

In various embodiments of the present disclosure described below, a hardware approach will be described as an example. However, since various embodiments of the present disclosure include technology using both hardware and software, various embodiments of the present disclosure do not exclude a software-based approach.

In order for a 5G system (5GS) to interwork with external networks to provide a time sensitive communication (TSC) service, a time sensitive network-application function (TSN AF) or a time sensitive communication time synchronization function (TSCTSF) makes events for user plane node management information (UMI) and port management information (PMI) subscribe to a user plane function/network side-TSN translator (UPF/NW-TT), and the UPF/NW-TT needs to notify the TSN AF or the TSCTS of results of the corresponding events.

To this end, in the conventional 5GS service-based architecture (SBA) structure without a service-based interface (SBI) to UPF/NW-TT, as in the procedure of FIG. 3, the TSN AF or the TSCTSF transmits an event subscription for UMI and PMI to the UPF/NW-TT via a policy control function (PCF) and a session management function (SMF) through an N4 interface, and receives the results of the events via the SMF and the PCF through the N4 interface.

In a structure without a UPF service interface (Nupf), there was an inefficient aspect in that the UMI and the PMI passed through the function nodes even though the UMI and the PMI transmitted between the TSN AF or the TSCTSF and the UPF/NW-TT were unnecessary information for the PCF and the SMF which are intermediate function nodes.

Hereinafter, the present disclosure relates to a method of providing a UPF exposure service to provide a TSC service by making 5GS interwork with a TSN and non-TSN network in a structure in which UPF/NW-TT is included in a 5GS SBA. More specifically, the present disclosure relates to a method of directly exposing, by UPF/NW-TT, TSC event processing results through an interface (Nupf_EventExposure) with TSN AF or TSCTSF without passing through other nodes.

To this end, the TSN AF or the TSCTSF may include additional control information in a TSC event subscription procedure through the conventional PCF and SMF.

As a result, according to the present disclosure, when the 5GS provides a 5GS TSC service by interworking with an external network, by providing a method of directly reporting and notifying a TSN AF or TSCTSF, by UPF/NW-TT, of event result information through a service interface (Nupf), it is possible to provide a TSC event service more efficiently than in the related art.

FIG. 1 is a diagram illustrating an example of a 5GS architecture in which SBA is applied to UPF according to various embodiments of the present disclosure.

Referring to FIG. 1, FIG. 1 illustrates a 3GPP 5GS architecture in which 5G UPF is included in SBA. That is, the UPF is additionally connected to and included in an SBA structure of each network function (NF) of a control plane as an SBI called Nupf in addition to the conventional N4 interface as an interface with the SMF. This is currently under study at Rel-18.

A network function (NF) illustrated in FIG. 1 is described in detail in Chapter 6, TR 23.700-62 of 3GPP TS 23.501 V18.0.0 (2022-12).

Referring to FIG. 1, user equipment (UE) and an access and mobility management function (AMF) may be connected through an N1 interface. The N1 interface may be defined as a non-access-stratum (NAS) protocol between the UE and the AMF (3GPP TS24.501) and is in charge of communication, and the N1 interface is used first when the UE is connected to a network. Information transmitted and received between the UE and the AMF through the N1 interface may include management information for authentication and security of the UE, management information for mobility of the UE by tracking location information and status of the UE, session control information transmitted to the SMF, and the like.

The AMF and a radio access network (RAN) may be connected through an N2 interface. The N2 interface is defined as an NG application protocol (NGAP) between the RAN and the AMF (3GPP T S38.401 and TS38.413). The N2 interface may be in charge of control for transmitting user data, authentication and security data, location information, mobility-related data, and the like between the RAN and the AMF.

The RAN and the UPF/NW-TT may be connected to each other through an N3 interface. The N3 interface is defined as a general packet radio service (GPRS) tunneling protocol (GTPv1-U) between the RAN and the UPF (3GPP TS29.281; the N3 interface may transmit user data between the RAN and the UPF/NW-TT, quality of service (QoS) information, and the like).

The UPF/NW-TT and the SMF may be connected through an N4 interface. The N4 interface is defined as a packet forwarding control protocol (PFCP) between the UPF/NW-TT and the SMF (3GPP TS29.244). The N4 interface may transmit and receive control information for session management between the SMF and the UPF.

The UPF/NW-TT and a data network (DN) may be connected through an N6 interface. The N6 interface is an interface between the UPF/NW-TT and the DN, and the data transmitted to the interface with the data network outside the 5G network may be, for example, IP packet data when the DN is the Internet, and Ethernet packet data when the DN is the TSN.

An N9 interface of the UPF/NW-TT is in charge of communication between the UPF/NW-TT and another UPF/NW-TT, and the corresponding N9 interface may use the same GTPv1-U protocol used in the N3 interface.

Figure 2A:
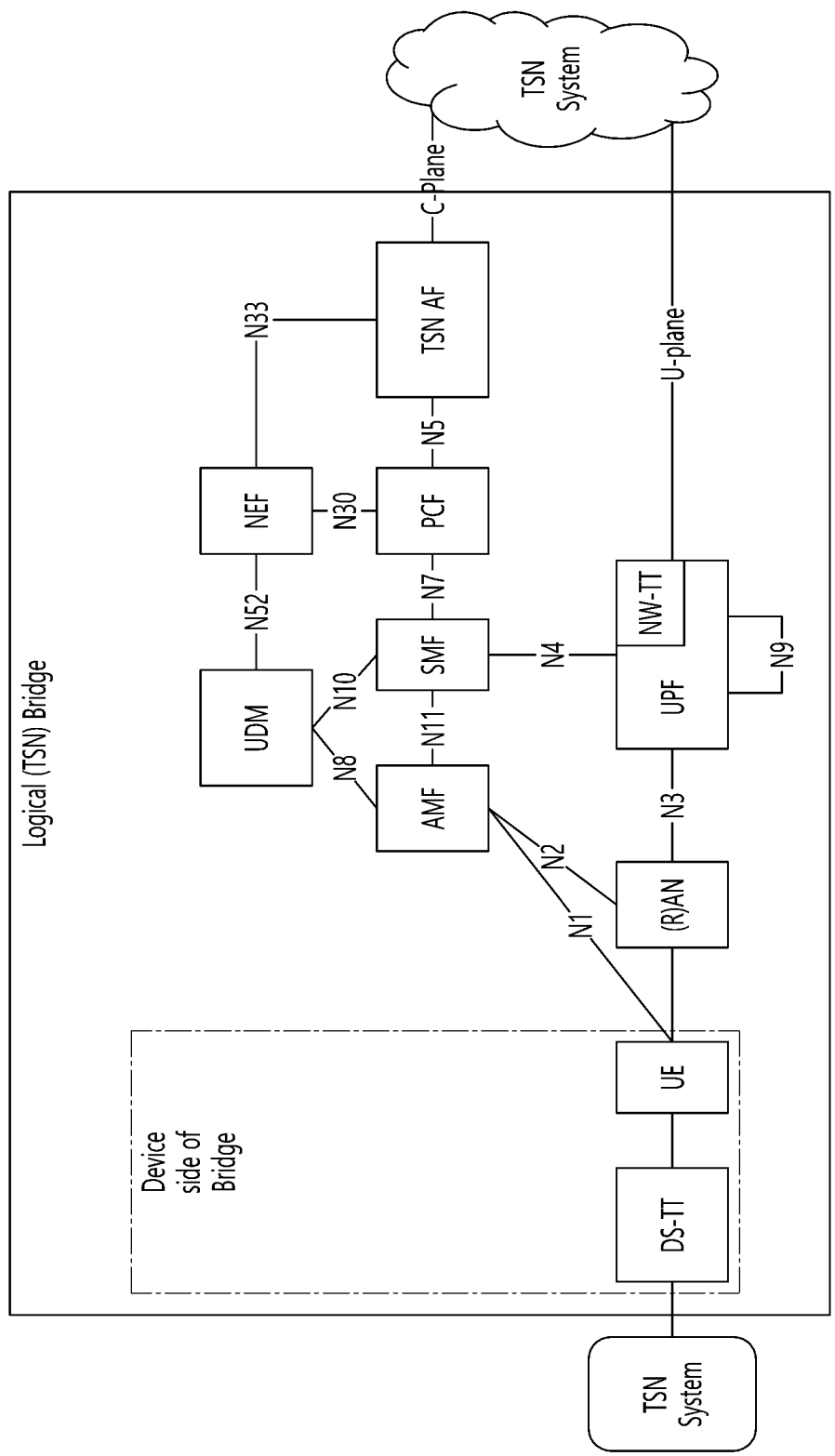
FIGS. 2A and 2B are diagrams illustrating an example of a 5G system architecture supporting a time sensitive networking (TSN) bridge and a time sensitive communication (TSC) service according to various embodiments of the present disclosure.
Figure 2B:
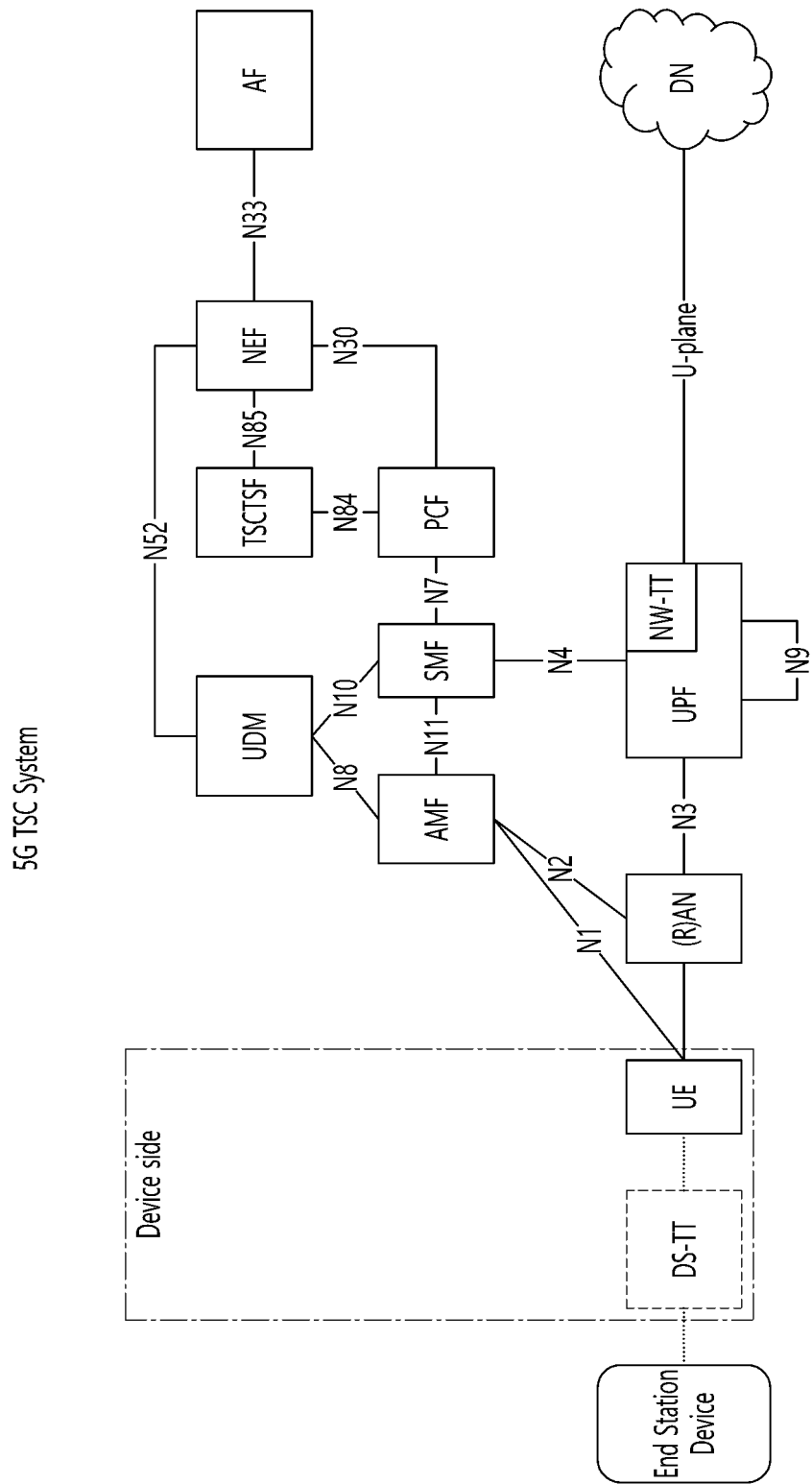

FIGS. 2A and 2B are diagrams illustrating an example of a 5GS architecture supporting a time sensitive networking (TSN) bridge and a time sensitive communication (TSC) service according to various embodiments of the present disclosure.

Referring to FIGS. 2A and 2B, FIGS. 2A and 2B may be an example of the 5GS architecture in which the 5GS supports the TSC service by interworking with the TSN or non-TSN network. FIG. 2A may illustrate a structure when the 5GS defined in the Rel-16 operates with the TSN network, and FIG. 2B may illustrate an extended structure in the Rel-17 so that the 5GS may provide the TSC services to application services in the interworking environment with the non-TSN network. To this end, the TSN AF or the TSCTSF in the 5GS may need mutual communication with the UE/DS-TT and the UPF/NW-TT in the 5GS.

Referring to FIG. 2A, a logical TSN bridge 5GS may operate in connection with the TSN system. To this end, the logical TSN bridge 5GS may have a control plane interface (C-Plane) and a user plane (U-Plane) interface with the TSN system. First, the U-Plane interface requires TSN Translators (TTs) to interwork with the 5GS and the TSN system. The DS-TT may exist on a device side and the NW-TT may exist on a network side. The DS-TT may be logically connected to the UE of the 5GS and the NW-TT may be logically connected to the UPF of the 5GS. These TTs allow the 5GS TSN bridge to operate as the logical TSN bridge within the TSN network and communicate with 5GS NFs according to the 5G standard within the 5GS.

In FIG. 2A, the TSN AF is an AF network function for supporting the TSN applications, among which various AFs may exist depending on applications in a 5G network. The TSN AF is in charge of control for communication between the TSN network and the 5G network.

Referring to FIG. 2B, unlike FIG. 2A, the TSCTSF is added instead of the TSN AF. The TSCTSF has a function similar to the TSN AF to support the TSC service when the external DN is the non-TSN and requests the TSC service, and additionally, when the 5GS provides an initiator service, the TSCTSF may support the external DN in using the initiator service.

FIG. 3 is a diagram illustrating an example of an event processing procedure related to the TSN and TSC between a TSN AF or a TSCTSF and a UPF/NW-TT according to various embodiments of the present disclosure. According to the TS 24.519 v17.1.0 standard, the TSN AF or the TSCTSF may transmit the TSC management information (e.g., TSCMgntInfo in FIG. 3) to the UPF (strictly, NW-TT).

According to an embodiment, the TSCMgntInfo may include the UMI, the PMI, the desired operation (acquisition/event processing/configuration), and additional information according to the corresponding operation. For example, when the TSCMgntInfo is an event operation (e.g., change in UMI or PMI), the TSCMgntInfo may include event report information. When reporting the event result, the TSCMgntInfo may include an event report mode that is one of a duration, a number, and a period of an event report, an immediate reporting flag, a threshold of information at which a specific report occurs, and the like.

Referring to FIG. 3, FIG. 3 illustrates an event processing operation, and the TSN AF or the TSCTSF may request the PCF to perform an event subscription through the Npcf_PolicyAutthorization_Create/Update/Subscribe service operation, including the TSCMgntInfo which is the TSC management information (301). The Npcf_PolicyAuthorization_Create/Update/Subscribe function may be a service operation used when requesting the PCF to create, update, or subscribe to a new policy rule or policy group.

In response to operation 301, the PCF may transmit the TSCMgntInfo to the SMF through the Npcf_SMPolicyControl_UpdateNotify_service (303). According to an embodiment, smPolicyData included in the Npcf_SMPolicyControl_UpdateNotify_service may include the TSCMgntInfo. The Npcf_SMPolicyControl_UpdateNotify_service operation of operation 303 may notify the SMF of the policy update transmitted from the PCF.

In response to operation 303, the SMF may know that the corresponding event subscription is an event that the UPF/NW-TT needs to process, and transmit the event to the UPF/NW-TT through the N4 interface (N4 session modification Req/Rsp) to complete the event subscription (305). According to an embodiment, the N4 session modification Req transmitted through the N4 interface may include the TSCMgntInfo.

Operation 307 may include operation 307a of transmitting, by the UPF/NWTT, the N4 session modification Rsp, which includes the updated TSCMgntInfo including the event result, to the SMF and operation 307b of transmitting, by the UPF/NWTT, the N4 session report, which includes the updated TSCMgntInfo including the event result, to the SMF.

The N4 session modification response of operation 307a is a response message to a session modification request transmitted from the UPF/NW-TT to the SMF. This message may include whether the modification operation is performed successfully, the session modification result, detailed information of the modified session, and the like.

The N4 session report of operation 307*b* is a message transmitted from the user plane function (UPF/NW-TT) to the SMF to report the session information. Even through the message, the updated TSCMgntInfo including the event result may be transmitted.

In response to operation 307, the SMF may transmit smPolicyData including the updated TSCMgntInfo including the event result to the PCF through an Npcf_SMPolicyControl_Update message (309). The Npcf_SMPolicyControl_Update in operation 309 may process the policy update information received from the PCF in operation 303 and update the related session information.

In response to operation 309, the PCF may report the updated TSCMgntInfo including the event result to the TSN AF or the TSCTSF through the Npcf_PolicyAuthorizationNotify message (311). The Npcf_PolicyAuthorizationNotify in operation 311 is a policy authorization notification message transmitted from the PCF to the TSN AF or the TSCTSF, and finally transmits the TSC event result to the TSN AF or the TSCTSF.

For example, as the most common example of the TSC event processing, the UPF/NW-TT that receives an event reporting when the UMI of the corresponding 5GS logical TSN bridge or TSC system and PMI of a specific port are changed may load the UMI or PMI of a designated port for changed matters when the corresponding event occurs on the updated TSCMgntInfo and report the UMI or the PMI to the TSN AF or the TSCTSF. In this case, the protocol specifications between the TSN AF or the TSCTSF and the NW-TT for this are described in detail in TS24.519 (V17.1.0).

According to TS23.501 (V17.4.0) section 5.28.3, the UMI information may include 5GS bridge information for performing a bridge function in a 5G network, configuration information for discovering and communicating with neighbor network devices (neighbor discovery configuration), discovered neighbor information, stream parameters, time synchronization information for a precision time protocol (PTP) instance, time synchronization related data sets defined according to the IEEE 1588 standard (IEEE Std 1588 data sets), time synchronization related data sets defined according to the IEEE 802.1AS standard (IEEE Std 802.1AS data sets), time synchronization information for DS-TT ports, and the like.

The PMI may include bridge delay related information generated by a bridge, traffic class related information, gate control information, neighbor discovery configuration, NW-TT neighbor discovery configuration, DS-TT neighbor discovery configuration, neighbor discovery information for each discovered neighbor of NW-TT, stream parameters, pre-stream filtering and policy information (PSFP information), time synchronization related data sets defined according to the IEEE 1588 standard (IEEE Std 1588 data sets), and time synchronization related data sets defined according to the IEEE 802.1AS standard (IEEE Std 802.1AS data sets).

Details of the above-described PMI and UMI are described in detail in the TS23.501 (V17.4.0) standard.

Figure 4:
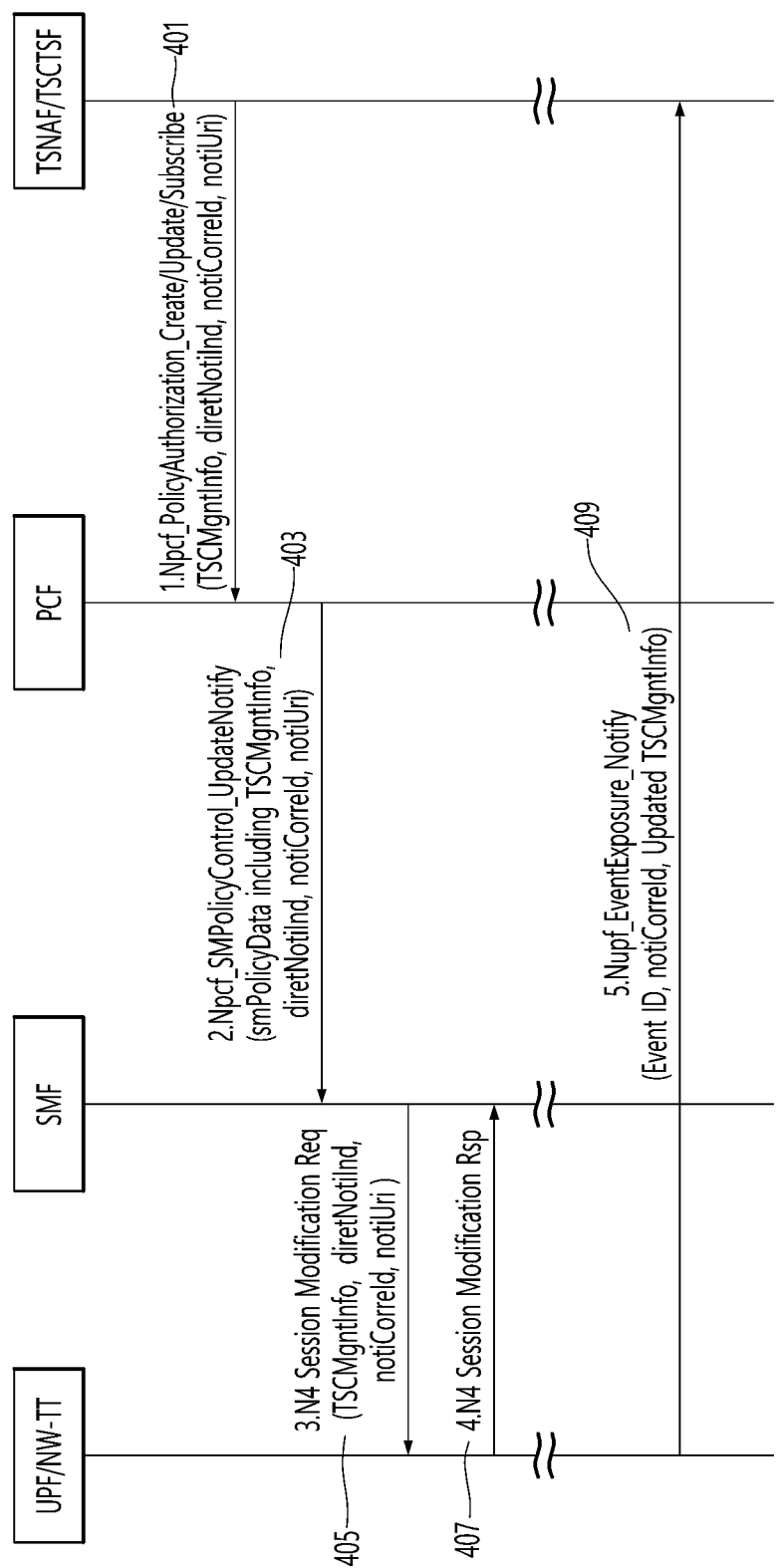
FIG. 4 is a diagram illustrating an example of the event processing procedure related to the TSN and TSC between the TSN AF or the TSCTSF and the UPF/NW-TT according to an embodiment of the present disclosure.

FIG. 4 is a diagram illustrating an example of the event processing procedure related to the TSN and TSC between the TSN AF or the TSCTSF and the UPF/NW-TT according to an embodiment of the present disclosure.

Referring to FIG. 4, when compared with the procedure of FIG. 3, the procedure for the TSN AF or the TSCTSF to perform the TSN and TSC event subscription to the UPF/NW-TT in operations 401 to 405 may be the same except that an additional information element is included in each step of the procedure (operations 401, 403, and 405).

In response to operation 405, when DirectNotiInd and the direct transmission of the event result are implicitly recognized, the UPF/NW-TT may transmit a response of N4 session modification Req through N4 session modification Rsp regardless of the result of the corresponding event (407).

Thereafter, the UPF/NW-TT may directly report the result of the corresponding event to the TSN AF or the TSCTSF through a newly created Nupf service interface without passing through the intermediate SMF and PCF (409). Nupf_EventExposure_Notify of operation 409 is a service operation of notifying of the result of the corresponding event when the requested event from the TSN AF or the TSCTSF occurs in the UPF/NW-TT.

To this end, the TSN AF or the TSCTSF may transmit additional control information in addition to the conventional TSC management information (indicated as TSCMgntInfo in FIG. 4) when subscribing. The added control information may include at least one of a notification target address (notification URI), a notification correlation ID, and a direct notification indication.

The notification target address is a target destination address where the result of result is notified, and may be the address of the TSCTSF or the TSN AF to which the UPF/NW-TT transmits the result of the corresponding event.

The notification correlation ID may be information for matching the result of the requested event when the TSN AF and the TSCTSF, which initially requested the event subscription, receive a result of the corresponding event from the UPF/NW-TT.

The direct notification indication may be an indication that instructs that the TSN AF and the TSCTSF, which initially requested the event subscription, directly receive the result of the corresponding event from the UPF/NW-TT through the Nupf_EventExposure SBI.

According to an embodiment, whether to use the direct notification indication may be an option. Therefore, the TSN AF or the TSCTSF may clearly notify of this indication to the UPF/NW-TT, but it may implicitly indicate the direct transmission of the event result by transmitting the notification target address. That is, when the UPF/NW-TT receives the notification target address, the UPF/NW-TT may directly transmit the event result to the target address through the SBI, and when the UPF/NW-TT does not receive it, the UPF/NW-TT may transmit the event result to the SMF through the N4 interface.

Referring to FIG. 4, a detailed procedure that differs from that of FIG. 3 by including the processing of control information compared to the prior art during the operation of FIG. 4 is as follows.

The UPF/NW-TT may additionally receive the control information from the TSN AF or TSCTSF via the PCF and SMF for the direct transmission of the event result information along with the TSCMgntInfo which is the conventional TSC management information (operation 401 to operation 405).

The TSN AF or the TSCTSF may transmit the TSC management information and the control information to the PCF through an Npcf_PolicyAuthorization_Create/Update/Subscribe service operation (401). The information transmitted in operation 401 may include the TSC management information and the control information within AppSessionContextReData or AppSessionContextUpdateData, which are the conventional input parameters of each service operation, or may be defined as other parameters and transmitted (401).

In response to operation 401, the PCF may include the TSC management information and the control information within smPolicyDecision, which is the existing input parameter of an Npcf_SMPolicyControl_UpdateNotify_service operation, or may be defined as other parameters and transmitted to the SMF (403).

In response to operation 403, the SMF may regenerate and transmit the TSC management information and the control information to the UPF using the packet forwarding control protocol (PFCP) protocol of the N4 interface through the N4 session modification Req (405).

The UPF/NW-TT receiving the TSC management information and the control information may directly report the result information of the event by using the Nupf_EventExposure_Notify service operation to the TSN AF or the TSCTSF, which is the notification target address, among the received control information, when the corresponding event occurs (409). In this case, the notification correlation ID information received through the event ID and the control information may be additionally included along with the TSCMgntInfo, which is updated TSC management information including event result information.

The event ID is unique identification information indicating an event that the TSN AF, TSCTSF, and UPF/NW-TT all share and know about, and may be an ID indicating that it is a "TSC Management Info" event.

The notification correlation ID may be the information for matching the result of the requested event when the TSN AF and the TSCTSF receive the corresponding event result from the UPF/NW-TT.

According to various embodiments of the present disclosure, a method of processing TSN and TSC events between TSN AF or TSCTSF and UPF/NW-TT in a 5GS includes: receiving, by PCF, TSC management information and control information necessary for direct reporting and notification of an event result from the TSN AF or the TSCTSF when performing a TSC event subscription and transmitting the TSC management information and the control information to an SMF through an SBI; regenerating, by the SMF, the TSC management information and the control information received from the PCF through the SBI and transmitting the TSC management information and the control information to the UPF/NW-TT through an N4 interface; receiving, by the UPF/NW-TT, the TSC management information and the control information received from the SMF, and when a corresponding event occurs directly transmitting the TSC management information including the event result to a target included in the control information through the SBI.

According to an embodiment, the control information may include at least one of the notification target address, the notification correlation ID, and the direct notification indication.

According to an embodiment, the notification target address is a target destination address where the result is notified, and may be the address of the TSCTSF or the TSN AF to which the UPF/NW-TT transmits the result of the corresponding event.

According to an embodiment, the notification correlation ID may be information for matching a result of a requested event among a plurality of events when the TSN AF or the TSCTSF, which initially requested event subscription, receive the corresponding event result from the UPF/NW-TT.

According to an embodiment, the direct notification indication may be an indication that instructs that the TSN AF or the TSCTSF, which initially requested the event subscription, directly receive the result of the corresponding event from the UPF/NW-TT through the SBI.

According to an embodiment, the SBI between the PCF and the TSN AF or the TSCTSF may be at least one of Npcf_PolicyAuthorization, Npcf_SMPolicyControl.

According to an embodiment, by using the direct notification indication or notification target address for the corresponding event received by the UPF/NW-TT through the N4 interface, UPF/NWTT may identify whether the result of the corresponding event is transmitted to the SMF through the N4 interface or to directly transmit the result to the target notification address.

According to an embodiment, the SBI service operation used when the UPF/NW-TT transmits the TSC management information including the event result may be Nupf_EventExposure_Notify.

According to an embodiment, the Nupf_EventExposure_Notify may further include the event ID and the notification correlation ID.

According to an embodiment, the event ID is the unique identification information indicating the event that the TSN AF, TSCTSF, and UPF/NW-TT all share and know about, and may indicate that it is a "TSC Management Info" event.

According to an embodiment, the TSC management information that the UPF/NW-TT receives from the TSN AF or the TSCTSF through the PCF and the SMF may further include a detailed event name to subscribe to, event subscription information that is target information of the corresponding event, and event report information which is additional information required when reporting the result of the corresponding event.

According to an embodiment, the event subscription information may include at least one of the UMI and the PMI as information to subscribe to a detailed event.

According to an embodiment, the UMI information may include at least one of 5GS bridge information, configuration information for discovering and communicating with neighbor network devices, discovered neighbor information, stream parameters, time synchronization information for a PTP instance, time synchronization related data sets defined according to the IEEE 1588 standard, time synchronization related data sets defined according to the IEEE 802.1AS standard, or time synchronization information used in DS-TSS.

According to an embodiment, the PMI information may include at least one of bridge delay related information generated by a bridge, traffic class related information, gate control information, neighbor discovery configuration, NW-TT neighbor discovery configuration, DS-TT neighbor discovery configuration, neighbor discovery information for each discovered neighbor of NW-TT, stream parameters, PSFP information, time synchronization related data sets defined according to the IEEE 1588 standard, and time synchronization related data sets defined according to the IEEE 802.1AS standard.

According to an embodiment, the event report information is additional information required when reporting an event result, and includes an event report mode that is one of a duration, a number, and a period of an event report, an immediate reporting flag, and a threshold of information at which a specific report occurs.

The present disclosure, which will be described in detail below, relates to a method of providing, by a UPF, an efficient event exposure service in the structure in which the UPF is included in the 5GS SBA architecture. More specifically, the present disclosure relates to a method of more consistently and efficiently processing an event subscription from another control NF to a UPF through an SMF by providing, by the UPF, capabilities of an event exposure service of the UPF to the SMF during an initial association setup process with the SMF.

Figure 5A:
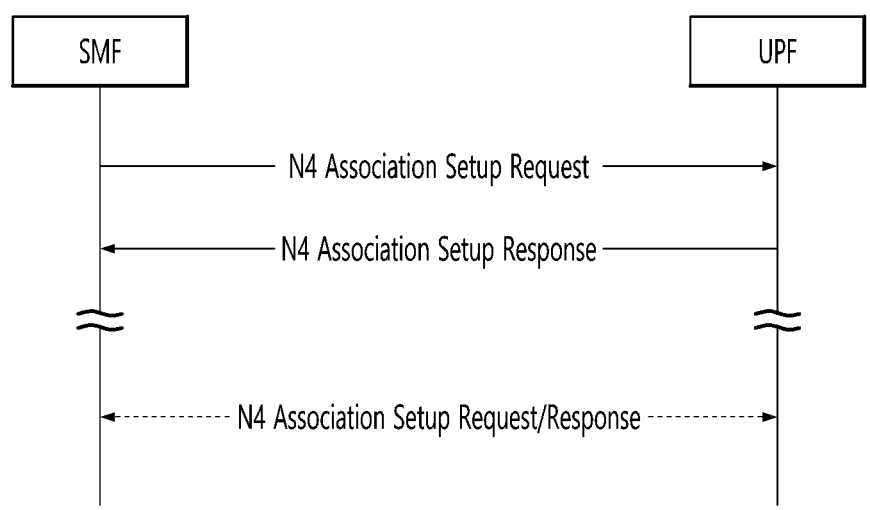

FIGS. 5A and 5B are diagrams illustrating an example of an initial association setup procedure and an exchanged information element between a conventional session management function (SMF) and UPF according to various embodiments of the present disclosure. In FIG. 5B, "P" may mean "Property," "M" may mean "Mandatory," and "C" may mean "Conditional."

Referring to FIGS. 5A and 5B, FIGS. 5A and 5B illustrate an initial association setup procedure and some of exchanged information elements through the N4 interface between the conventional SMF and UPF.

Referring to FIG. 5A, the SMF may transmit an N4 association setup Request message to the UPF. According to an embodiment, the N4 association setup Request message may include the address of the SMF and other information.

The UPF may transmit an N4 association setup Response message to the SMF. According to an embodiment, the N4 association setup Response message may include the address of the UPF and other information.

Detailed information of the information exchanged with the corresponding procedure related to FIG. 5A is described in detail in TS 29.244 V17.3.0 (2021-12) sections 6.2.5 to 6.3.3 and 7.4.4.

Referring to FIG. 5B, information elements exchanged between the SMF, which is a control plane (CP) function, and the UPF, which is a user plane (UP) function, may include Node ID, recovery time stamp, UP function features, and CP function features.

An IE type of the node ID may be "Node ID," an IE type of the recovery time stamp may be "recovery time stamp," an IE type of the UP function features may be "UP function features," an IE type of the UP function features may be "UP function features," and an IE type of the CP function features may be "CP function features."

According to an embodiment, the Node IE may include a unique IP address or other types of identification for distinguishing the transmitting node within the network.

According to an embodiment, the recovery time stamp may be an IE indicating the time at which the CP or UP function starts. The recovery time stamp may be used to record the time when a previously interrupted CP or UP function is resumed. For example, when the CP or UP function is interrupted due to a network error or other problems, this information may be used to restore the interrupted function to its previous state when the system restarts.

According to an embodiment, the UP function features are information elements that may be present when the UPF transmits a message including the UP function features IE and supports at least one UP feature defined in the UP function features IE.

According to an embodiment, the CP function features are information elements that may be present when the SMF transmits a message including the CP function features IE and supports at least one CP feature in which the CP function is defined in the UP function features IE.

Basically, it is possible to mutually exchange other pieces of necessary information, including notifying each other about each supportable function, along with the start time of the SMF which is the CP function and the UPF which is the UP function.

In the 3GPP SA2 Rel-17 standard, only a point-to-point type N4 interface is specified for the interface between the SMF and the UPF, and is defined using the PFCP protocol of TS 29.244 (Stage 3). Meanwhile, since the UPF is at the center of the traffic processing, the UPF may be a final node that collects much traffic-related information such as traffic session and QoS information.

Therefore, in the 5GS architecture, various control NF nodes (network data analytics function (NWDAF), AF, TSN AF, TSCTSF, etc.) inside the 5GS need to obtain the traffic QoS and the performance information by interworking with the UPF to provide application services. As an example, the NWDAF needs to make an event about QoS information of a specific session subscribe to the UPF and receive the result. As another example, the TSN AF or the TSCTSF performs the subscription of the events for the UMI and the PMI to the UPF/NW-TT, and the UPF/NW-TT needs to notify the TSN AF or the TSCTSF of the result of the corresponding event.

Hereinafter, an object of the present disclosure provides a method of more efficiently providing a service when the UPF provides an event service through an event exposure service interface (Nupf_EventExposure) in the 5GS.

To this end, a method and apparatus for more consistent event subscription from other NFs to a UPF through an SMF and efficient transmission of the event processing result in the UPF by providing, by the UPF, capabilities of an event exposure service of the UPF to the SMF through an N4 interface with the SMF during the initial association setup will be described.

That is, an object of the present disclosure is, when the UPF provides an event service through the event exposure service interface (Nupf_EventExposure) in the 5GS, after the SMF confirms capability information of a target UPF when using the event exposure service of the UPF, to provide a more efficient event exposure service of the UPF by requesting the UPF event exposure within its capability range.

To this end, in order to efficiently provide the event exposure service of the UPF, which is the object of the present disclosure, the UPF may provide, to the SMF, the information on the capabilities of the event exposure service that the UPF can provide during the initial association setup with the SMF. According to an embodiment, the capability information may include event ID list information that the UPF can support under the name of "supported event list," information on whether the SBI is supported between the SMF and the UPF, information on whether direct reporting of the corresponding event result is supported, and the like.

As a result, by providing the capability information of the event exposure service that the UPF can provide in the 5GS to the SMF during the initial association setup with the SMF, it is possible to more efficiently provide a UPF event exposure service when the SMF uses the event service of the UPF.

FIG. 6 is a diagram illustrating an example of event exposure capability information element of the UPF transmitted from the UPF to the SMF through an N4 interface association setup procedure according to an embodiment of the present disclosure.

Referring to FIG. 6, the capability information of the event exposure service provided by the UPF to the SMF may be composed of the supportable event list. The inside of the list may include each event ID or name, whether or not each event can be supported by the SBI between the SMF and the UPF, and whether the direct reporting function of the event result is supported.

The SMF receiving the supported event list through the association setup message may store the supported event list for use in the event processing in the future. When the supported event list information element is not included in the association setup message, the SMF may determine that the UPF has only the conventional function of receiving an event subscription and transmitting the result only through the N4 interface. Also, when the corresponding information element is included, the information on at least one event may need to be included.

Thereafter, when the SMF receives a request for event subscription from another control NF to the UPF, the SMF may perform the event subscription to the UPF based on the supported event list received from the UPF during the initialization process. For example, when the corresponding event does not support the SBI, the direct reporting indication requested through the N4 interface and received from another control NF may also perform the event subscription to the UPF in consideration of whether the corresponding event supports the direct reporting function.

The supported event list information element may be included in an association setup message as an independent information element as illustrated in FIG. 6 or may be included in the conventional UP function feature or the like and transmitted in a different form with the same meaning.

Figure 7:
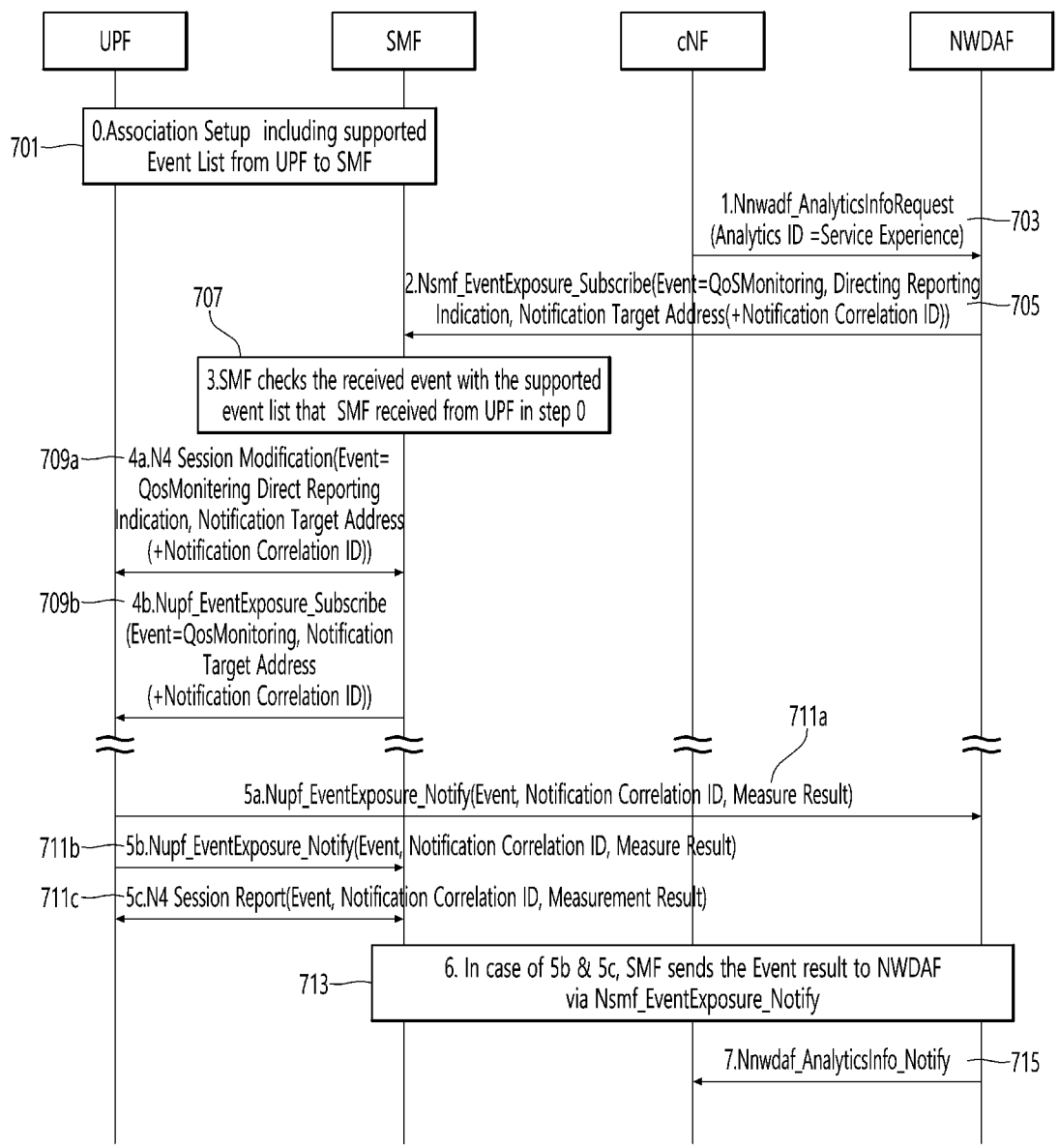
FIG. 7 is a diagram illustrating an example of a quality of service (QoS) monitoring event processing procedure between a network data analytics function (NWDAF) and the UPF according to an embodiment of the present disclosure.

FIG. 7 is a diagram illustrating an example of a QoS monitoring event processing procedure between a NWDAF and the UPF according to an embodiment of the present disclosure.

Referring to FIG. 7, when the UPF and the SMF first start, the initial configuration information including the CP and UP features or the like may be exchanged through the association setup procedure (701). In this case, the UPF may transmit the supported event list to the SMF (701).

Thereafter, the consumer NF (operation, administration, maintenance (OAM) or various NFs (e.g., Nikon electronic format (NEF)) may request QoS monitoring information from the NWDAF through an analytic ID (e.g., service experience) (703).

The NWDAF receiving the requested QoS monitoring information knows that the corresponding event is an event processed by the UPF and needs to find the corresponding session and serving UPF information, and therefore may request the corresponding event subscription from the SMF through an Nsmf_EventExposure_Subscribe service operation (705). In this case, the unique event ID or name, the direct reporting indication of the event result, and the notification target address (+notification correlation ID) to receive the corresponding event may be transmitted.

The SMF receiving the event subscription request from the NWDAF through the Nsmf_EventExposure_Subscribe service operation confirms that the corresponding event is an event that the UPF needs to process, and in operation 701, may also identify the additional information of the corresponding event in the supported event list information of the UPF received from the UPF (707).

Thereafter, when the corresponding event does not provide the SBI between the SMF and the UPF, the SMF may perform the event subscription to the UPF through the N4 session modification Req through the conventional N4 interface including the information received from the NWDAF (709*a*).

On the other hand, when the SBI is provided between the SMF and UPF of the corresponding event, the SMF may request the event subscription from the UPF through the Nupf_EventExposure_Subscribe operation, including the information received from the NWDAF (709*b*).

According to an embodiment, when the SMF performs the event subscription with the UPF through Nupf_EventExposure_Subscribe, the direct reporting indication may be omitted and replaced with the notification target address (+notification correlation ID).

The UPF receiving the event subscription request from the SMF through the N4 or Nupf_Eventexposure service stores the corresponding information, and then receives the subscription request through the N4 interface when the corresponding event occurs, and when the received direct reporting indication is indicated (e.g., direct reporting indication reporting indication is set to "1") or the subscription request is received through the Nupf_EventExposure, the UPF may directly transmit the event result to the notification target address received together (711*a*).

When the subscription request is received through the N4 interface and the direct reporting indication is not indicated (e.g., the direct reporting indication is set to "0"), the event processing result may be transmitted to the SMF (711*b*).

When the UPF transmits the result of the corresponding event to the SMF, the result may be transmitted through the interface requested to subscribe to the corresponding event (711*b* or 711*c*).

Meanwhile, the SMF receiving the result of the event from the UPF through the N4 or Nupf_EventExposure_Notify service operation may transmit the result to the NWDAF through the Nsmf_EventExposure_Notify (713).

Thereafter, the NWDAF may be transmitted to a final consumer NF (OAM or various NFs (e.g., NEF)) through Nnwdaf_AnalyticsInfo_Notify (715).

Figure 8:
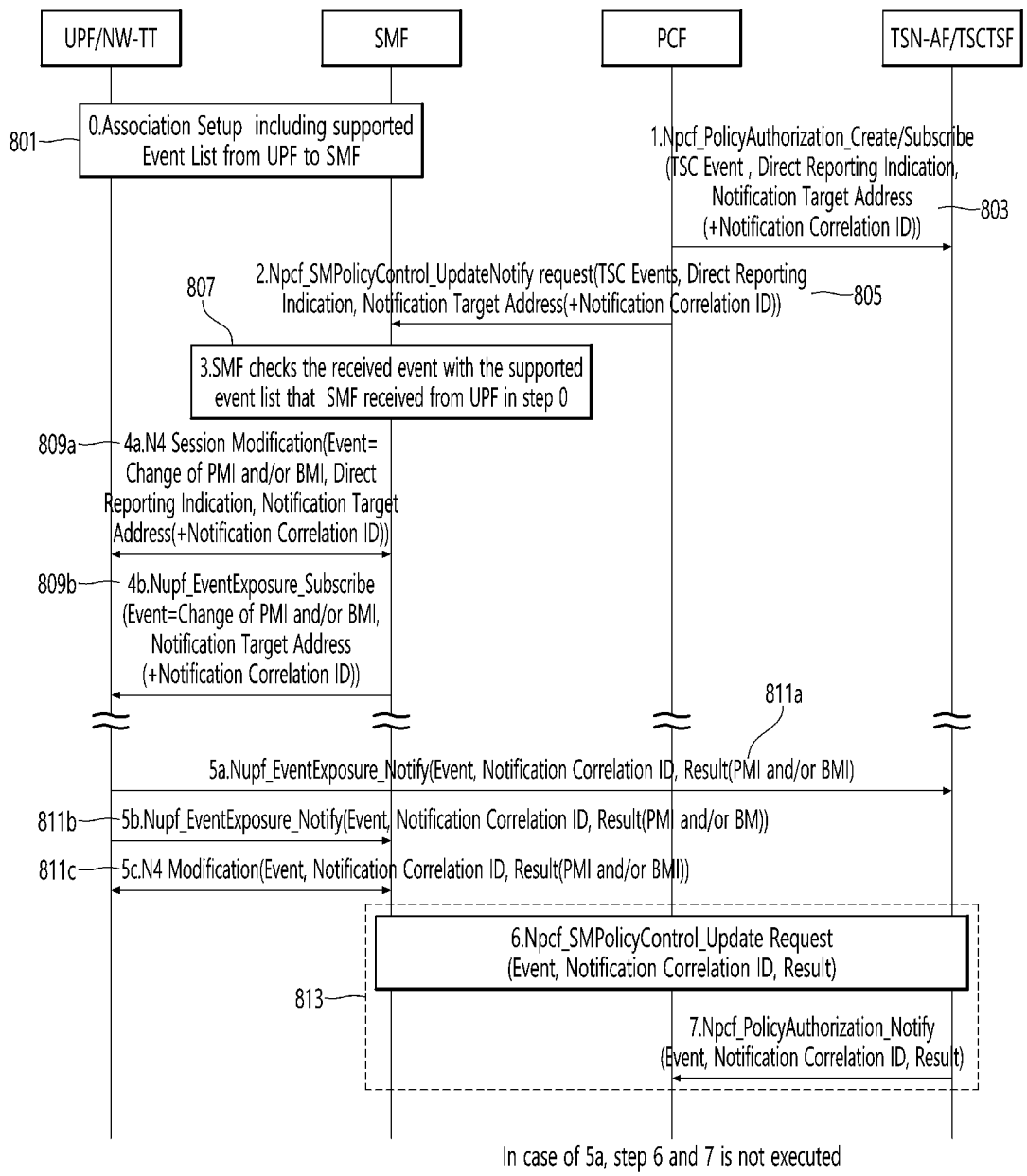
FIG. 8 is a diagram illustrating an example of the TSN AF or the TSCTSF event processing procedure and the UPF/NW-TT according to an embodiment of the present disclosure.

FIG. 8 is a diagram illustrating an example of the TSN AF or the TSCTSF event processing procedure and the UPF/NW-TT according to an embodiment of the present disclosure.

Referring to FIG. 8, when the UPF and the SMF first start, the initial configuration information including the CP and UP features or the like may be exchanged through the association setup procedure. In this case, the UPF may transmit the supported event list to the SMF (801).

Thereafter, the TSN AF or the TSCTSF may request the PCF to subscribe to the TSC event (e.g., Event=Change of PMI and/or BMI, PMI: port management information, BMI: bridge management information) through the Npcf_PolicyAuthorization_Create/Update/Subscribe service operation (803). In this case, the notification target address (+notification correlation ID) and the direct reporting indication of the event result may be included together with the event. The PCF receiving the notification target address (+notification correlation ID) and the direct reporting indication may request the event subscription from the SMF through the Npcf_SMPolicyControl_UpdateNotify_service operation including all the received information (805).

The SMF receiving the event subscription request from the PCF through the Npcf_SMPolicyControl_UpdateNotify_service operation confirms that the corresponding event is an event that the UPF needs to process, and in operation 801, may also identify the additional information of the corresponding event in the supported event list information of the UPF received from the UPF (807).

Thereafter, when the corresponding event does not provide the SBI between the SMF and the UPF, the SMF may perform the event subscription to the UPF through the N4 session modification Req through the conventional N4 interface including the information received from the PCF (809a).

On the other hand, when the SBI is provided between the SMF and UPF of the corresponding event, the SMF may request the event subscription from the UPF through the Nupf_EventExposure_Subscribe operation, including the information received from the PCF (809b).

When the SMF performs the event subscription with the UPF through Nupf_EventExposure_Subscribe, the direct reporting indication may be omitted and replaced with the notification target address and the notification correlation ID.

The UPF receiving the event subscription request from the SMF through the N4 or Nupf_Eventexposure service stores the corresponding information, and then receives the subscription request through the N4 interface when the corresponding event occurs, and when the received direct reporting indication is indicated (e.g., direct reporting indication is set to "1") or the subscription request is received through the Nupf_EventExposure, the UPF may directly transmit the event result to the notification target address received together (811a).

When the subscription request is received through the N4 interface and the direct reporting indication is not indicated (e.g., the direct reporting indication is set to "0"). The result may be transmitted to the SMF (811b).

When the UPF transmits the result of the corresponding event to the SMF, the result may be transmitted through the interface requested to subscribe to the corresponding event (811b or 811c).

In response to operation 811b or operation 811c, the SMF receiving the result of the corresponding event from the UPF through the N4 or Nupf event exposure service may transmit the result to the TSN AF or the TSCTSF via the PCF through the Npcf_SMPolicyControl and Npcf_PolicyAuthorization services (813).

Figure 9:
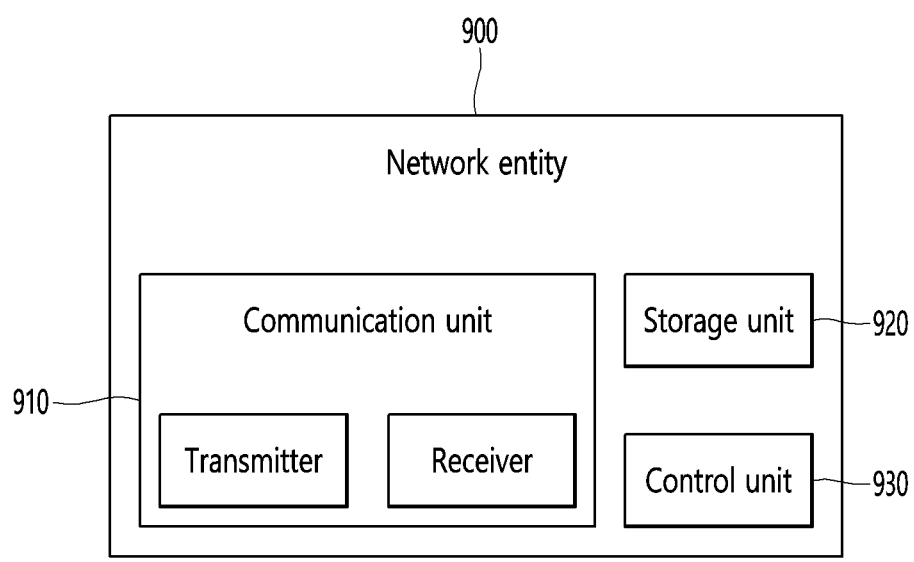
FIG. 9 is a diagram illustrating a configuration of a network entity in a wireless communication system according to various embodiments of the present disclosure.

FIG. 9 is a diagram illustrating a configuration of a network entity in a wireless communication system according to various embodiments of the present disclosure. The concept of a network entity of the present disclosure includes a network function according to system implementation. The term "unit," "-or/-er," or the like described below means a unit of processing at least one function or operation and may be implemented by hardware or software or a combination of hardware and software. A network entity 900 according to various embodiments of the present disclosure may include a communication unit 910, a storage unit 920, and a control unit 930 that controls overall operations of the network entity 900. The communication unit 910 transmits and receives signals with other network entities. Accordingly, all or part of the communication unit 910 may be referred to as a "transmitter," "receiver," or "transmitter and receiver or transceiver." The storage unit 920 stores data such as basic programs for an operation of the network entity 900, application programs, and setting information. The storage unit 920 may include a volatile memory, a non-volatile memory, or a combination of the volatile and non-volatile memories. The storage unit 920 provides the stored data according to the request of the control unit 930. The control unit 930 controls a general operation of the network entity 900. For example, the control unit 930 transmits and receives signals through the communication unit 910. In addition, the control unit 930 writes and reads data in and from the storage unit 920. The control unit 930 may perform protocol stack functions required by communication standards. To this end, the control unit 930 may include a circuit, an application-specific circuit, at least one processor or microprocessor, or may be a part of a processor. Also, a part of the communication unit 910 and the control unit 930 may be referred to as a communication processor (CP). The control unit 930 may control the network entity 900 to perform any one operation of various embodiments of the present disclosure. The communication unit 910 and the control unit 930 do not necessarily have to be implemented as separate modules, but may be implemented as a single component in the form of a single chip or software block. The communication unit 910, the storage unit 920, and the control unit 930 may be electrically connected. In addition, the operations of the network entity 900 can be implemented after the storage unit 920 for storing the corresponding program code is provided in the network entity 900. The network entity 900 may be a network node, a base station (RAN), AMF, SMF, UPF, NF, NEF, NRF, CF, NSSF, UDM, AF, AUSF, SCP, UDSF, consumer NF (cNF), NWDAF, context storage, OAM, EMS, a configuration server, identification (ID) management server, NW-TT, DS-TT, or any one of network functions illustrated in FIGS. 1 and 2.

According to various embodiments of the present disclosure, a method of providing an event exposure service of a UPF in 5GS may include: receiving and storing, by an SMF, capability information of an event exposure providing service of the UPF from the UPF through an association setup procedure, which is an initial setting process between UPFs; receiving, by the SMF, a processing event subscription request of the UPF from another NF and confirming the capability information of the event exposure providing service of the UPF received from the UPF through an initial setting process between the received event and the UPF; requesting, by the SMF, the corresponding event subscription from the UPF through an N4 interface or an Nupf_Eventexposure service according to the capability information of the event exposure service of the UPF; receiving, by the UPF, the event subscription request from the SMF and directly transmitting the result to another NF requested by the SMF through the SMF or SBI according to the instruction of the SMF when the corresponding event occurs.

According to an embodiment, the capability information of the event exposure providing service of the UPF provided by the UPF to the SMF through the association setup procedure may include at least one of event ID list information that the UPF can support, whether the SBI is supported between the SMF and the UPF of the corresponding event, and whether the direct reporting of the corresponding event is supported.

According to an embodiment, when the SMF performs the event subscription with the UPF through the N4 interface or the SBI-based Nupf_Eventexposure service, it may include at least one of the event ID, the direct reporting indication, and the notification target address.

According to an embodiment, when the corresponding event received by the UPF occurs, the result may be transmitted to the SMF or another NF using at least one of the direct reporting indication or the notification target address received from the SMF.

According to an embodiment, when the corresponding event received by the UPF occurs and the result is transmitted to the SMF, it may be transmitted to the interface (N4 or Nupf_Eventexposure service) that receives the subscription request.

According to an embodiment, other NFs may all be control NFs communicable through the SMF and SBI in the 5GS architecture, such as NWDAF, TSCTSF, AF, or TSN AF.

Terms that refer to signals, terms that refer to channels, terms that refer to control information, terms that refer to network entities, terms that refer to device components of a device, and the like which are used in descriptions to be described below are exemplified for convenience of description. Accordingly, the present disclosure is not limited to terms described below, and other terms having equivalent technical meanings may be used.

In addition, although the present disclosure describes various embodiments using terms used in some communication standards (e.g., 3rd Generation Partnership Project (3GPP)), this is only an example for description. Various embodiments of the present disclosure may be easily modified and applied to other communication systems.

Methods according to the embodiments described in the claims or specifications of the present disclosure may be implemented in the form of hardware, software, or a combination of hardware and software.

When implemented in software, a computer-readable storage medium for storing one or more programs (software modules) may be provided. One or more programs stored in the computer-readable storage medium are configured to be executed by one or more processors in an electronic device. One or more programs include instructions for causing an electronic device to execute methods according to embodiments described in a claim or specification of the present disclosure.

Such programs (software modules, software) include a random access memory, a non-volatile memory including a flash memory, a read only memory (ROM), an electrically erasable programmable read only memory (EEPROM), a magnetic disk storage device, a compact disc-ROM (CD-ROM), a digital versatile discs (DVD), any other form of optical storage device, and a magnetic cassette. Alternatively, it may be stored in a memory composed of a combination of some or all thereof. In addition, each configuration memory may be included in plurality.

In addition, the program may be stored in an attachable storage device that may be accessed through a communication network such as the Internet, an intranet, a local area network (LAN), a wide area network (WAN), a storage area network (SAN), or a combination thereof. Such a storage device may be connected to a device implementing an embodiment of the present disclosure through an external port. In addition, a separate storage device on the communication network may be connected to the device implementing the embodiment of the present disclosure.

In the specific embodiments of the present disclosure described above, elements included in the disclosure are expressed in the singular or plural according to the specific embodiments presented. However, the singular or plural expression is appropriately selected for the context presented for convenience of description, and the present disclosure is not limited to the singular or plural components, and even if the component is expressed in plural, the component may be configured in singular or even if the component is expressed in singular, the element may be configured in plural.

According to an apparatus and method according to various embodiments of the present disclosure, when a 5G system (5GS) interworks with an external network (TSN or non-TSN) to provide a 5GS TSC service to an external application service, a UPF/NW-TT directly exposes an event result to a TSN AF or a TSCTSF through a service interface (Nupf), and as a result, when the corresponding event occurs, the UPF/NW-TT reports the result to the TSN AF and the TSCTSF, thereby resolving the inefficiency of passing through intermediate function nodes (SMF and PCF) that exist in the conventional procedures.

Effects which can be achieved by the present disclosure are not limited to the above-described effects. That is, other objects that are not described may be obviously understood by those skilled in the art to which the present disclosure pertains from the above detailed description.

Meanwhile, although specific embodiments have been described in the detailed description of the present disclosure, various modifications are possible without departing from the scope of the present disclosure. Therefore, the scope of the disclosure is not construed as being limited to the embodiments described above, but should be defined by the following claims as well as equivalents thereto.

What is claimed is:

1. A method of operating event processing for time sensitive networking (TSN) or time sensitive communication (TSC) in a wireless communication system, the method comprising:
    when a policy control function (PCF) performs a TSC event subscription, transmitting TSC management information and control information to a session management function (SMF) using a Npcf_SMPolicy service interface, wherein the control information is required for direct reporting notification of an event result from a user plane function/network side-TSN translator (UPF/NW-TT) to a TSC time synchronization function (TSCTSF);
    regenerating, by the SMF, the TSC management information and the control information received from the PCF and transmitting the regenerated TSC management information and the control information to the UPF/NW-TT through an N4 interface; and
    receiving, by the UPF/NW-TT, the TSC management information and the control information received from the SMF, and when a corresponding event occurs, directly transmitting the TSC management information including the event result to a notification target address using a Nupf_EventExposure_Notify service interface,
    wherein the control information includes a notification target address and a notification correlation identifier,
    wherein the notification target address includes an address of the TSCTSF to which the UPF/NW-TT transmits the result of the corresponding event, and
    wherein the notification correlation identifier is included in the Nupf_EventExposure_Notify service interface.

2. The method of claim 1, wherein the control information further a direct notification indication.

3. The method of claim 1, wherein the notification correlation identifier includes information for matching a result of a requested event among a plurality of events when the TSCTSF, which initially requested an event subscription, receive a result of the corresponding event from the UPF/NW-TT.

4. The method of claim 2, wherein the direct notification indication includes an indication that instructs that the TSCTSF, which initially requested an event subscription, directly receive a result of the corresponding event from the UPF/NW-TT using the Nupf_EventExposure_Notify service interface.

5. The method of claim 1, wherein the directly transmitting of the TSC management information by the UPF/NW-TT includes identifying whether to directly transmit the event result to the notification target address or to the SMF through the N4 interface using the direct notification indication or notification target address for the corresponding event received by the UPF/NW-TT through the N4 interface.

6. The method of claim 1, wherein the TSC management information includes a name of a detailed event to subscribe to, event subscription information that is target information of the corresponding event, and event report information that is additional information required when reporting a result of the corresponding event.

7. The method of claim 6, wherein the event subscription information includes user plane node management information (UMI) and port management information (PMI).

8. The method of claim 7, wherein the UMI information includes at least one of 5G system (5GS) bridge information, configuration information for discovering and communicating with neighbor network devices (neighbor discovery configuration), discovered neighbor information, stream parameters, time synchronization information for a precision time protocol (PTP) instance, time synchronization related data sets defined according to the IEEE 1588 standard (IEEE Std 1588 data sets), time synchronization related data sets defined according to the IEEE 802.1AS standard (IEEE Std 802.1AS data sets), or time synchronization information used in DS-TSS (time synchronization information for DS-TT ports).

9. The method of claim 7, wherein the PMI includes at least one of bridge delay related information generated by a bridge, traffic class related information, gate control information, neighbor discovery configuration, NW-TT neighbor discovery configuration, DS-TT neighbor discovery configuration, neighbor discovery information for each discovered neighbor of NW-TT, stream parameters, pre-stream filtering and policy information (PSFP information), time synchronization information, PTP instance specification, time synchronization related data sets defined according to the IEEE 1588 standard (IEEE Std 1588 data sets), and time synchronization related data sets defined according to the IEEE 802.1AS standard (IEEE Std 802.1AS data sets).

10. An apparatus for operating event processing for time sensitive networking (TSN) or time sensitive communication (TSC) in a wireless communication system, the apparatus comprising:
one or more computer-executable units being configured and executed by a processor using algorithms associated with at least one non-transitory storage device, the algorithms, when executed, causing the processor to execute the one or more computer-executable units, the one or more computer-executable units comprising:
a policy control function (PCF), a session management function (SMF), and a user plane function/network side-TSN translator (UPF/NW-TT),
wherein, when the PCF performs a TSC event subscription, the PCF transmits TSC management information and control information to the SMF using a Npcf_SMPolicyControl service interface, wherein the control information is required for direct reporting notification of an event result from the UPF/NW-TT to a TSC time synchronization function (TSCTSF), the SMF regenerates the TSC management information and the control information received from the PCF through the SBI and transmits the regenerated TSC management information and the control information to the UPF/NW-TT through an N4 interface, and
the UPF/NW-TT receives the TSC management information and the control information received from the SMF, and when a corresponding event occurs, directly transmits the TSC management information including the event result to a notification target address using a Nupf_RventExposure_Notify service interface,
wherein the control information includes a notification target address and a notification correlation identifier,
wherein the notification target address includes an address of the TSCTSF to which the UPF/NW-TT transmits the result of the corresponding event, and
wherein the notification identifier is included in the Nupf_EventExposure_Notify service interface.

11. The apparatus of claim 10, wherein the control information further includes a direct notification indication.

12. A method of operating a time sensitive communication time synchronization function (TSCTSF) in a wireless communication system, comprising:
transmitting TSC management information and control information to a user plane function/network side-TSN translator (UPF/NW-TT) via a policy control function (PCF) and a session management function (SMF) using a Npcf_PolicyAuthorization, a Npcf_SMPolicyControl service interface and a N4 interface, wherein the control information is required for direct reporting notification of an event result from the UPF/NW-TT to the TSCTSF; and
receiving directly the TSC management information including the event result using a Nupf_EventExposure_Notify service interface from the UPF/NW-TT when a corresponding event occurs,
wherein the control information includes a notification target address and a notification correlation identifier,
wherein the notification target address includes an address of the TSCTSF to which the UPF/NW-TT transmits the result of the corresponding event, and
wherein the notification correlation identifier is included in the Nupf_EventExposure_Notify service interface.

13. The method of claim 1, further comprising:
when the PCF performs the TSC event subscription, receiving the TSC management information and the control information from the TSCTSF.

14. The apparatus of claim 10, wherein when the PCF performs the TSC event subscription, the PCF further receive the TSC management information and the control information from the TSCTSF.

15. The method of claim 6, wherein the notification correlation identifier includes information for matching a result of a requested event among a plurality of events-when the TSCTSE, which initially requested an even subscription, receives a result of the corresponding event from the UPF/NW-TT.

* * * * *